Aug. 11, 1970 — P. AMBILL — 3,523,326
AUTOMATIC MACHINE FOR SCALDING PORK CARCASSES AFTER BLEEDING
Filed Oct. 19, 1967

INVENTOR:
Pierre Ambill
BY Spencer & Kaye
Attorneys

INVENTOR:
Pierre Ambill
BY Spencer & Kaye
Attorneys

# United States Patent Office 3,523,326
Patented Aug. 11, 1970

3,523,326
AUTOMATIC MACHINE FOR SCALDING PORK CARCASSES AFTER BLEEDING
Pierre Ambill, Saint-Etienne, France, assignor to Sagita S.A. (Le Gaz Industriel Tagolsheim-Paris), Tagolsheim (Haut-Rhin), France, a French society
Filed Oct. 19, 1967, Ser. No. 676,537
Claims priority, application France, Oct. 20, 1966, 9,564, Patent 1,497,342; July 3, 1967, 9,778
Int. Cl. A22b 5/08
U.S. Cl. 17—15                                    11 Claims

ABSTRACT OF THE DISCLOSURE

An automatic machine for scalding animal carcasses, the machine having a framework and means for suspending the carcasses and conveying them through the framework between two scalding frames mounted in the framework and driven in opposing reciprocal vertical motion so that one frame is in a high position when the other is in a low position, the scalding frames having hot water distributing elements provided with deflectors to cause the water to fall in sheets over the suspended carcasses, water connection means being provided on the frames for the distributing elements.

---

It is well known in slaughterhouses that after bleeding pork carcasses scalding is effected either by immersion in baths filled with hot water, or by means of vertical scalders enabling hot water to be sprayed on the suspended carcasses.

In the first case, this scalding by immersion is unhygenic and encourages a high proportion of microbial pollution resulting from the permanent pollution of the water and enry of the latter into the bleeding wound.

In the second case the vertical scalders are respectively constituted by a closed cabin enabling the carcass or carcasses to be mounted on movable carriages and suspended from the upper part of the cabin; hot water is sprayed from fixed rotatable sprays disposed within the cabin.

These known vertical scalders have several well known disadvantages. In effect, the projection under pressure and spraying of hot water causes a considerable cooling of this water which must therefore be heated to a high temperature.

Moreover, in these closed scalders, the scalding temperature is not uniform over the whole height of the cabin due to the depression engendered by opening and closing the doors. In practice, the scalding thus effected is very irregular and causes difficulties during the following hair-removing operation.

It was thus to obviate these disadvantages that it became necessary to make an automatic machine for scalding pork carcasses after bleeding.

In accordance with the invention, the machine comprises, on a portable framework, vertical guiding elements for at least two movable scalding frames, disposed to either side of a channel traversed by a suspension and conveying device for the carcasses, each frame being connected to a driving device cooperating with at least one reversing member, and adapted to actuate it in a reciprocating vertical motion, each frame having hot water distributing elements whose respective openings co-operate with deflectors which are preferably adjustable and intended to diminish the pressure of the water and ensure a flow in the form of a sheet which surrounds the carcasses.

In a particularly advantageous embodiment, the scalding frames are displaceable at the same frequency between the same extreme levels and are vertically separated so that one is in a high position when the other is in a low position.

Moreover, each hot water distributing element carried by the frames can be a tube on which is fixed a deflector having a profile in the form of a C defining an eccentric channel onto which laterally leads at least one opening of the tube, the deflector having a tangential extension of its curved portion, a flat projecting portion causing the water to flow in the form of a sheet.

In another embodiment, each hot water distributing element can be a tube closed by a deflector inclined on its axis, this tube having an inclined opening flush with the deflector.

Several other characteristics of the invention will appear from the following detailed description of various embodiments of the invention given by way of example with reference to the accompanying drawings in which.

As shown in FIGS. 1 to 11, the automatic machine for scalding pork carcasses after bleeding is formed essentially with a parallelepipedal framework formed preferably by four profiled iron uprights 1, crossbraced at their bases and at their ends by crosspieces in order to constitute a cage open on its four faces.

This cage is moreover reinforced transversely by exterior stays 3 secured to outwardly extending portions of the lower cross braces 2.

Slideways 4 are fixed vertically and symmetrically within the cage along its lateral sides over a certain height by means of supports 5 conveniently fixed on the framework.

The slideways 4 are disposed laterally in pairs and by means of their hollow section with one side slotted at $4^1$, enable the wings of T irons 6 fixed to the exterior of the opposed transverse sides of each of the mobile frames 7 to be freely slidingly engaged in the slots and actuated to perform a vertical reciprocating movement.

The lateral cross-members 101 of the framework enable vertical guide-support 8 to be fixed symmetrically to the exterior of the frame, each support 8 being formed by two corner irons $8^1$ and $8^2$ (FIG. 7) contiguously disposed but having a slight gap between them to enable the supporting brackets 9 to be fixed and adjusted in height.

Figure 5:
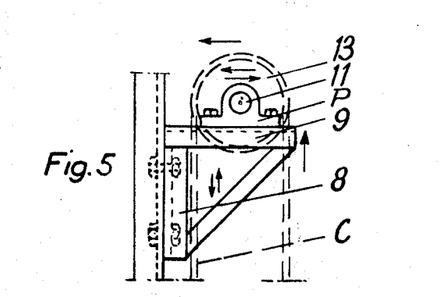
FIG. 5 is a detailed view showing an adjustable support for the manipulating chains.
Figure 6:
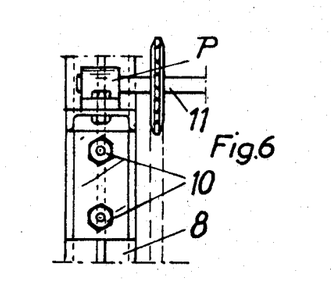
FIG. 6 is an end-elevation of the support shown in FIG. 5.
Figure 7:
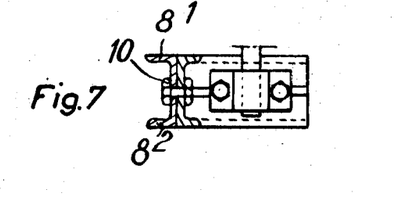
FIG. 7 is a plan-view of the support shown in FIG. 5.
Figure 8:
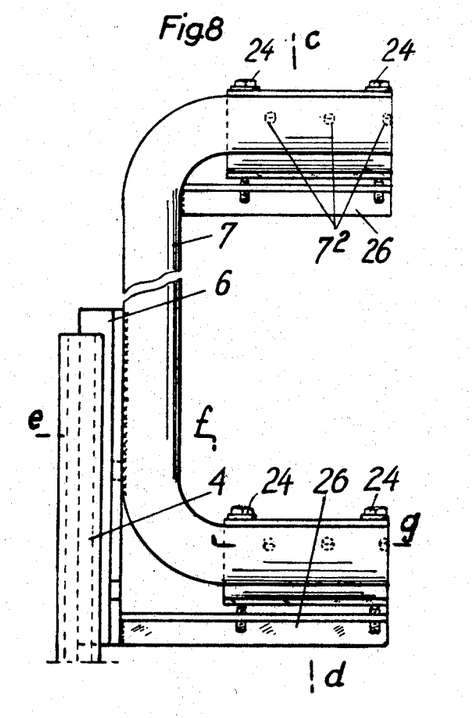
FIG. 8 is a partial front elevation to a larger scale of a mobile frame equipped with hot water spraying elements.
Figure 9:
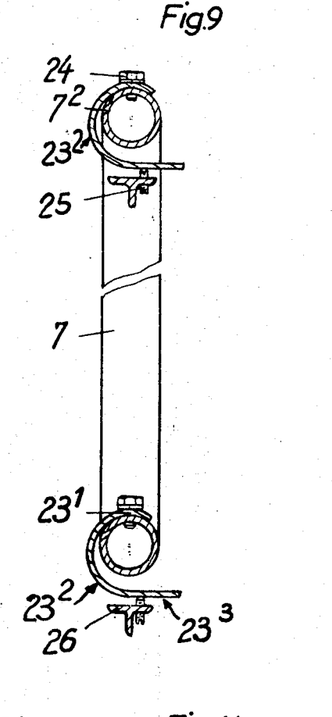
FIG. 9 is a side-view in transverse section along the line c–d of FIG. 8.
Figure 10:
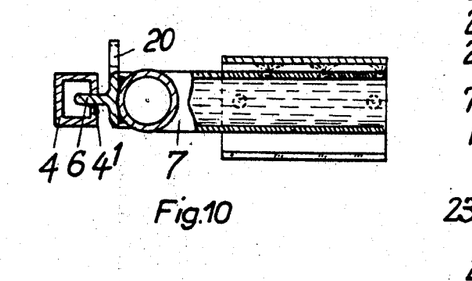
FIG. 10 is a plan-view in section along the line e–f–g of FIG. 8.

Two brackets 9 are fixed respectively within the framework to the two vertical guide supports 8 in such a manner as to be adjustable in height by means of bolts 10. These brackets, preferably formed by assembling profiled iron members as shown in FIGS. 5, 6 and 7, support on their horizontal portions bearings P which can be transversely adjusted.

At each lateral side, the upper and lower bearings P support longitudinally rotatable shafts 11, 12 on which are keyed pinions 13, 14, 15 and 16.

Each group of pinions 13, 14 and 15, 16 is connected by a transmission chain C whose free ends are fixed by any known means to the longitudinal opposite sides of the corresponding mobile frame 7 in order to effect the vertical displacement of the latter.

Figure 1:
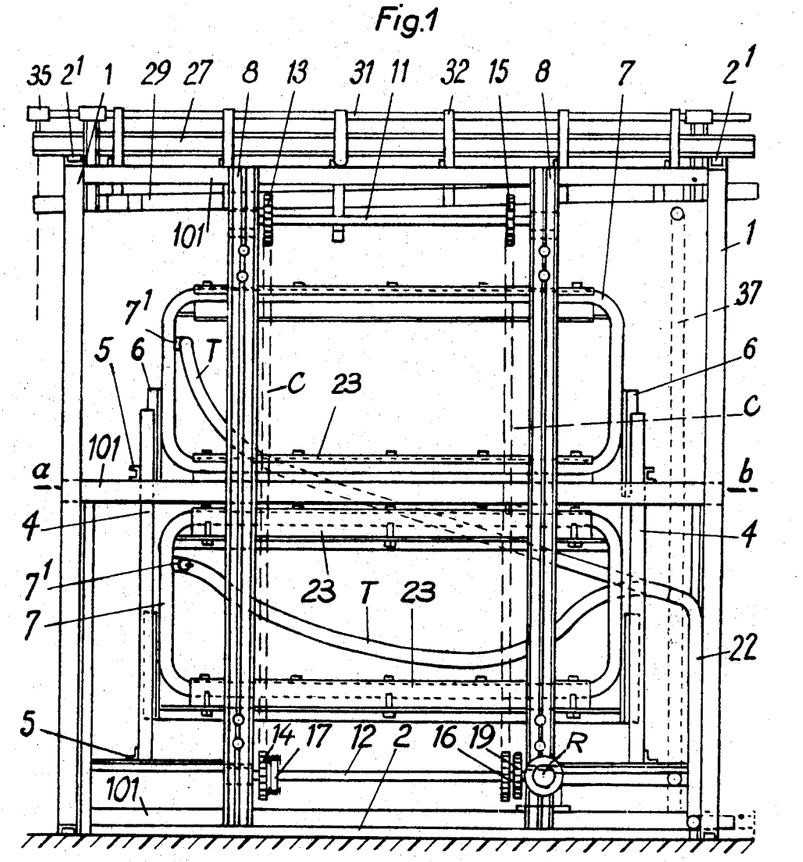
FIG. 1 is an elevation to a small scale of the exterior of an automatic scalding machine according to the invention.
Figure 2:
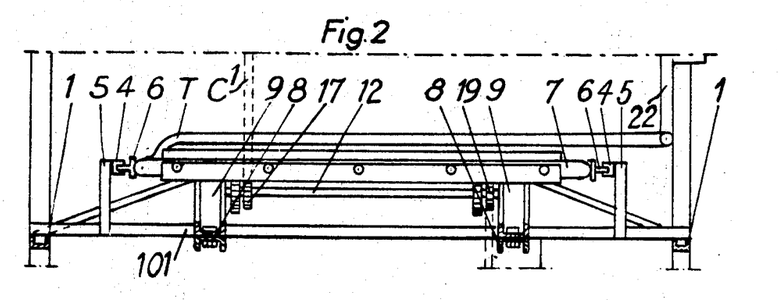
FIG. 2 is a view in plan and in cross section along the line a–b of FIG. 1.
Figure 3:
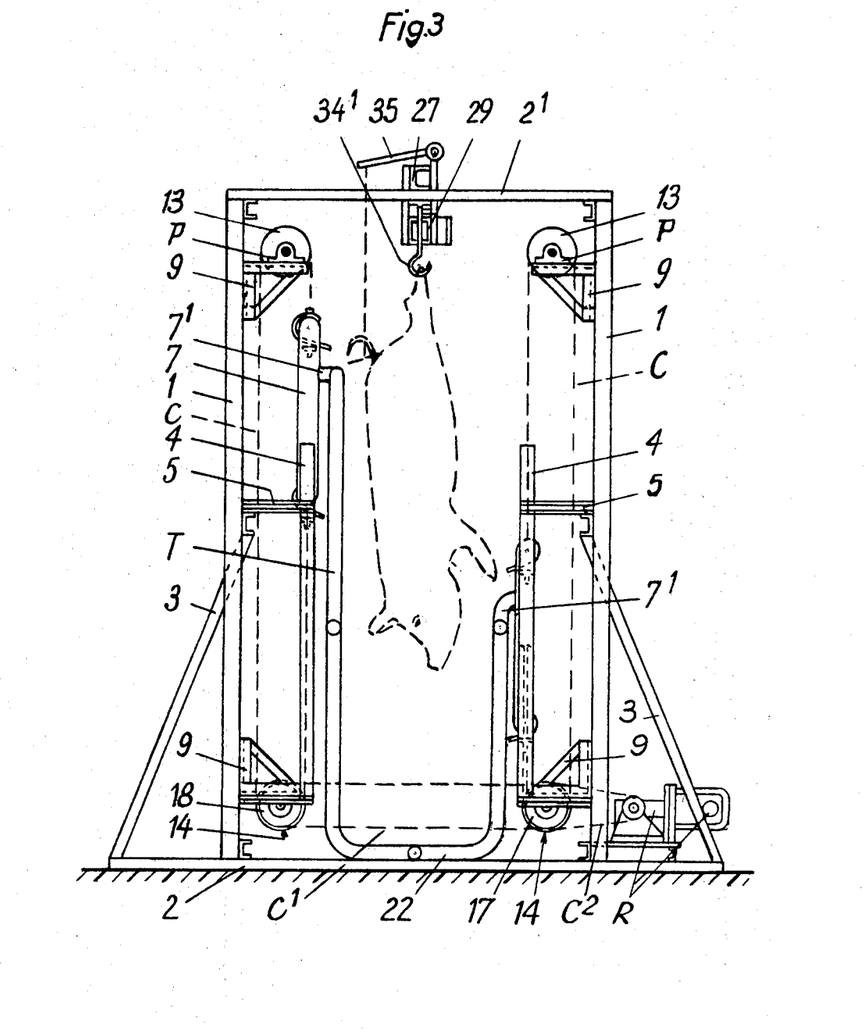
FIG. 3 is a side elevation of FIG. 1.
Figure 4:
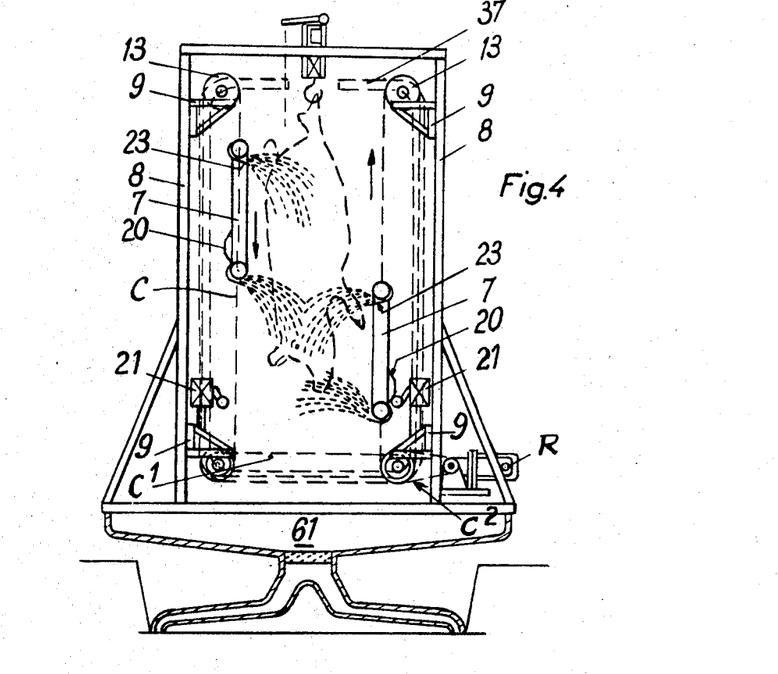
FIG. 4 is a schematic view to a small scale of the side view illustrating the operation of the machine.

It will be seen also that a horizontal transverse chain $C^1$ is mounted at the lower part of the machine to connect the pinions 17 and 18 keyed to the lower shafts 12 so as to ensure the simultaneous driving of the two mobile frames 7 which are, however, mounted at different heights as shown in FIG. 4.

A driving pinion 19 on a lower shaft 12 is connected by means of a chain $C^2$ to a motor reduction assembly R fixed to the framework.

Each mobile frame 7 has at its base a cam 20 which projects transversely so as to cooperate, in the lower position of the frame, with a lever of an electrical contactor 21 intended to reverse the direction of rotation of the motor reduction assembly R so as to cause alternately the vertical displacements of the mobile frames 7.

It is clear that any other arrangement could be used to control the alternate displacement of a mobile frame.

Each mobile frame 7 of hollow tubular section is moreover provided with an inlet tube $7^1$ which is connected by means of a flexible tube T to the corresponding arm of a distributor 22 in the form of a U transversely and axially fixed along one of the sides of the machine. This distributor 88 receives hot water from a heating tank which can be advantageously placed below the machine and which can be arranged so that portion forms a reception tank 6 for sprayed water as shown in FIG. 4.

The water from this tank is automatically filtered, recycled and renewed at the desired temperature in known manner and by any appropriate means.

Each mobile frame 7 thus disposed enables adjustable deflectors 23 to be fixed along its longitudinal sides, which deflectors are intended to ensure the adjustable distribution and flow of hot water over the axially suspended carcasses within the machine.

For this purpose, each deflector 23 in the form of a metal sheet or other similar material constitutes transversely a profiled channel of which the upper part $23^1$ covers the upper exterior portion of the corresponding tubular section of the mobile frames 7 and is fixed adjustably or otherwise by appropriate screws 24.

The upper part $23^1$ is extended by an eccentric portion $23^2$ which projects from the tubular periphery of the tube of the mobile frame 7 and forms at its extremity a flat projecting portion $23^3$ constituting a flow surface for the water.

It will be noted that the corresponding tube of the mobile frame 7 has openings or slots $7^2$ angularly disposed opposite the eccentric portion $23^2$ and adapted to project hot water.

Each deflector 23 is moreover vertically maintained at its base so as to be adjustable in height by means of a set screws 25 supported by the corresponding iron stay 26. As shown most clearly in FIG. 8, the upper stay 26 is connected at its ends between the vertical sides of the upper part of the frame 7 and the lower stay 26 is connected between iron 6.

Figure 11:
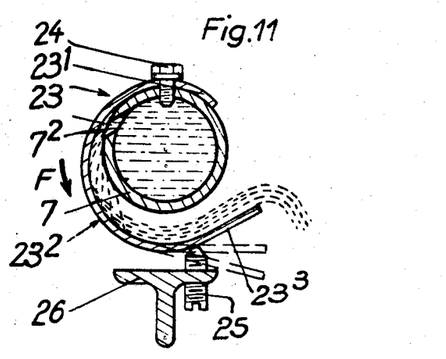
FIG. 11 is a transverse sectional view similar to that of FIG. 9 but to a larger scale showing the distribution and adjustable flow of hot water from each tube of the mobile frame.
Figure 12:
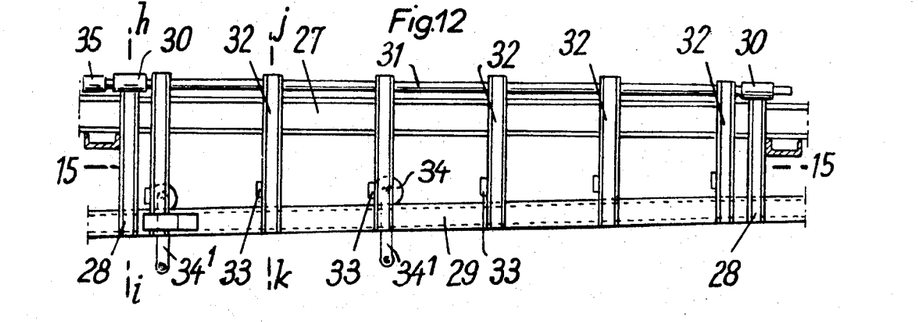
FIG. 12 is a detailed exterior view showing the suspension and conveying device for the carcasses rigidly fixed to the upper part of the machine.
Figure 13:
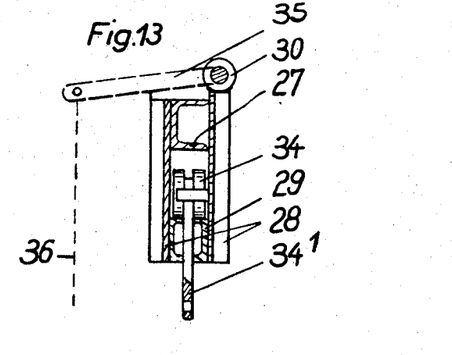
FIG. 13 is a side view to a larger scale and in transverse section along the line h–i of FIG. 12.
Figure 14:
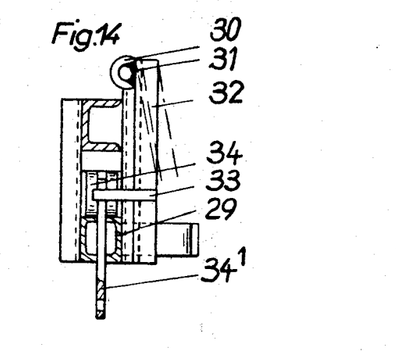
FIG. 14 is a side-view to a larger scale and in section along the line j–k of FIG. 12.
Figure 15:
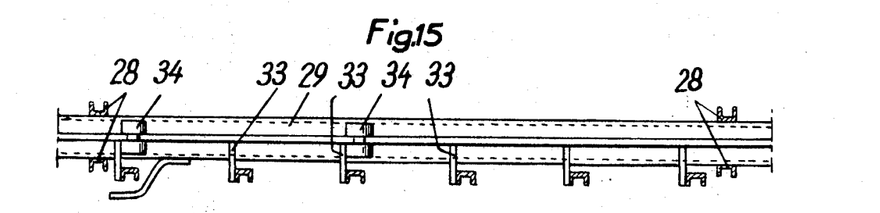
FIG. 15 is a plan-view in longitudinal section along the line 15—15 of FIG. 12.
Figure 16:
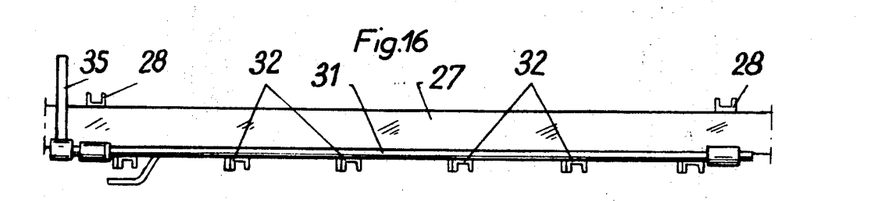
FIG. 16 is a top plan view of the exterior taken in the same direction as FIG. 15.
Figure 17:
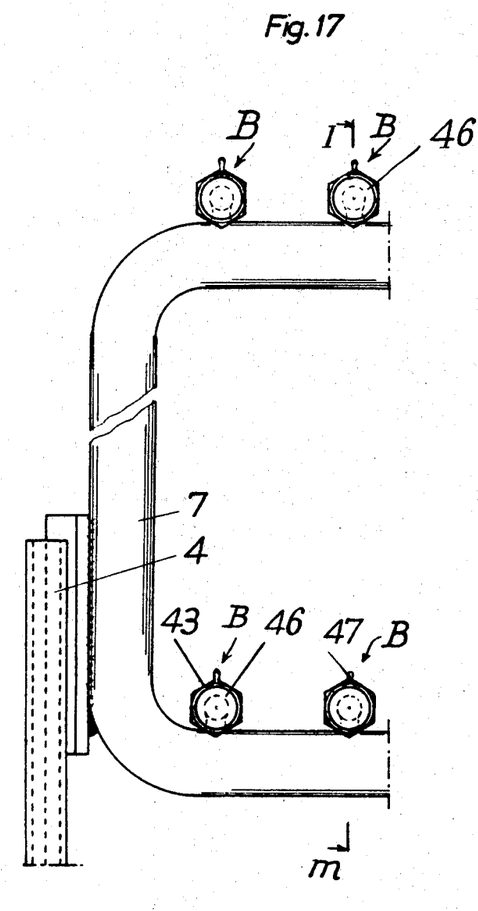
FIG. 17 is a partial front view similar to that of FIG. 8 and to a smaller scale showing a movable frame equipped with another embodiment of water flow device.
Figure 18:
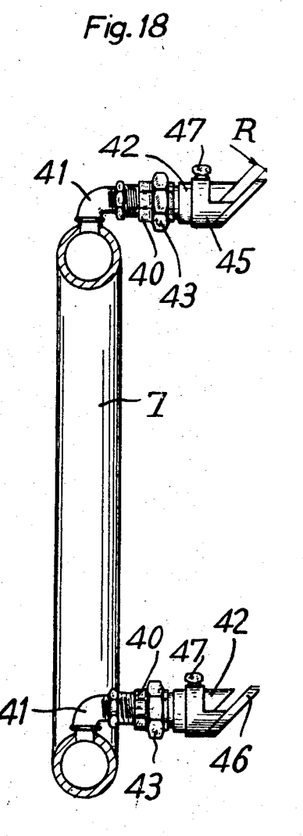
FIG. 18 is a side view in transverse section along the line l–m of FIG. 17.
Figure 19:
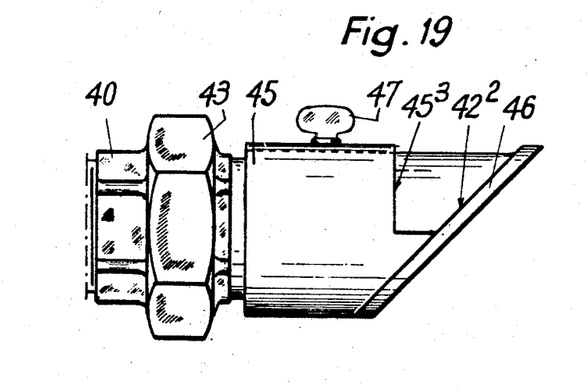
FIG. 19 is an exterior front view to a large scale of an evacuation tube of FIG. 18.
Figure 20:
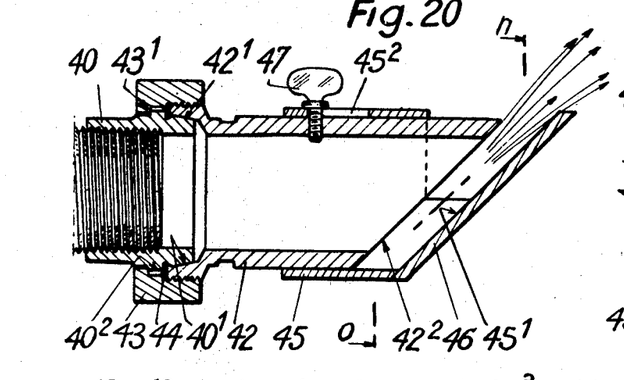
FIG. 20 is a front view in longitudinal section corresponding to FIG. 19.
Figure 21:
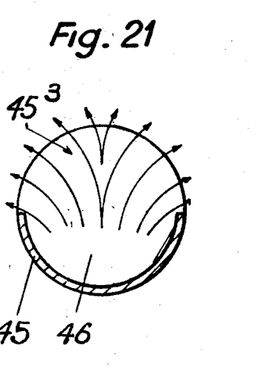
FIG. 21 is a side view in transverse section along the line n–o of FIG. 20.
Figure 22:
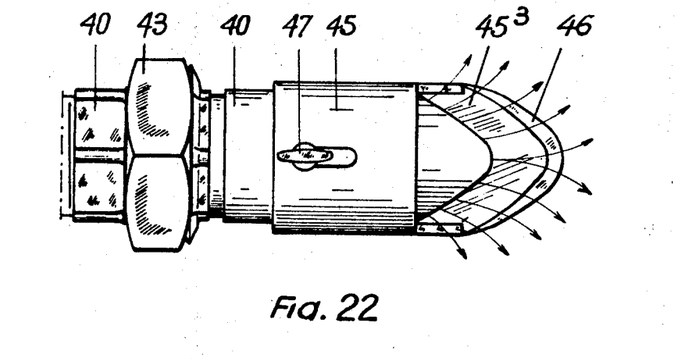
FIG. 22 is a plan view corresponding to FIG. 20.

With this arrangement, it will be seen that the hot water arriving through the openings $7^2$ is projected into the interior of the eccentric portion $23^2$ of the corresponding deflector 23 so as to diminish its pressure and impart to it a gyratory motion indicated by the arrow F of FIG. 11. This projection of water occurring in a confined space within the deflector 23 ensures that the temperature is maintained with a minimum of heat loss.

The resulting sheet of water thereafter flows under no pressure over the flat part $23^3$ onto the suspended carcasses.

It is important to note that the screw 25 enables angular adjustment of the portion $23^3$ to be effected, as shown in FIG. 11, in order to modify the angle and length of fall of the water. This arrangement thus ensures as desired, the adjustment of the fall of water from the longitudinal tubes of the same scalding frame 7, or the adjustment of the falls of water of one frame with respect to the other.

This arrangement also enables excellent scalding of the carcasses to be effected without projection of the water and on the contrary with a permanent flow of a sheet of hot water which practically retains the temperature at which it arrives at the interior of the scalding frames. Moreover, the arrangement of openings $7^2$ and deflectors 23 avoids a risk of blockage due to impurities contained in the recycled water.

The upper portion of the machine supports longitudinally the device for suspending the carcasses and conveying them between the scalding frames 7.

For this purpose, a profiled beam 27 is fixed axially on the upper crosspieces $2^1$ so as to receive at its extremities vertical arms 28 intended to support an inclined runway 29. This latter is constituted by two profiled U-section girders transversely separated from each other.

Along one lateral side, the supporting arms 28 are made rigid at their upper portion with rings 30 which carry a rotatable shaft 31 on which at regular intervals are mounted pivoting arms 32. The catches 33 fixed transversely on the arms 32 are disposed above the inclined runway 29 so as to stop respectively the suspension carriages 34 guided transversely by their attachment arms $34^1$ which slide between the profiled members of the runway 29.

A manipulating lever 35 with a chain 36 enables the rotation of the shaft 31 to be controlled so as to free simultaneously the catches 33 and to cause the carriages 34 and thus the pork carcasses to move under gravity between the two mobile frames 7. This control can also be effected automatically by cams or by any other means.

It is thus possible to advance the carcasses coming from the bleeding by degrees one by one, controlling the scalding time.

It is clear that the inclined runway 29 can be connected or not as desired to the conveyor used in the big slaughterhouses.

This machine thus formed can be completed by a chimney located in its upper portion for the evacuation of steam.

Finally, it is also possible to provide a peripheral protective housing around the framework.

The advantages of this automatic machine will appear from the description.

It will be noted that, as indicated in FIG. 4, a vertical frame 37 can be transversely mounted in known manner at the end of the machine to enable the carcass to be decontaminated by the emission of rays produced by a suitable device which is not illustrated.

Another embodiment of hot water flow device can be provided. It will appear clearly from the following description with reference to FIGS. 17 to 22.

Each mobile frame 7 which slides vertically and reciprocally on the slides 4 rigid with the cage, has mounted along its longitudinal (and possibly transverse) sides spray jets B, the number of which may vary, disposed transversely and preferably at regular intervals to provide a projection of hot water on the carcass or carcasses moving longitudinally between the two mobile frames 7.

For this purpose, each spray device B is provided with a connection 40 internally threaded to enable the fixing to one side thereof of a right angle elbow 41 fixed to the mobile frame 7 by any appropriate means, the elbow being in communication with the interior of the frame members.

At the opposite side, the connection 40 forms, externally at its end, a tapered portion $40^1$ which enables to be engaged and centered thereon the corresponding conical opening $42^1$ of a sleeve 42. A flange $40^2$ formed externally on the connection 40 engages with a shoulder $43^1$ of a clamping screw 43 freely engaged on the connection 40 and screwed on the threaded end of the sleeve 42 so as to secure it whilst at the same time enabling it to be rotatably adjusted. A joint 44 provides a seal.

The sleeve 42 of hollow cylindrical form has an oblique end face $42^2$ (at 45 degrees as shown in the drawings) whilst its periphery carries in slidable engagement a deflecting socket 45.

The socket 45 also has an oblique end face $45^1$ parallel to the face $42^2$ of the sleeve 42 but covered by a plate 46 forming an end which is fixed on the socket by welding or other suitable means. A slot $45^2$ formed longitudinally in the socket 45 cooperates with a locking screw 47 screwed in the sleeve 42 and adapted to enable the socket 45 to be londitudinally guided and adjusted.

An opening $45^3$ of semicircular section is cut or otherwise formed at the end of the socket 45 the end plate 46 being left in projection to preserve the external profile.

This spray device thus formed provides possibility of longitudinally adjusting the socket 45 with respect to the sleeve 42, to move the end plate 46 away from or towards the opening of the sleeve 42 as shown at R, whilst uncovering proportionally the opening $45^3$.

Thus, when the end plate 46 of the deflecting socket is in its maximum extended position with respect to the opening, the water pressure is portionally diminished so as to produce a less intense flow in fan-like form by means of the uncovered portion of the window $45^3$. It will be observed also that the inclination of the end plate 46 enables a transverse direction to be given to the water flow in combination with its fanned projection so that the flow can be directed as desired onto the carcasses within the machine.

In the opposite position of the end plate 46 of the deflecting socket in which the plate is moved towards the sleeve 42, the pressure of the water is not diminished whilst the uncovered portion of the opening $45^3$ is peripherally reduced. By this means, the flow which occurs with a certain pressure causes a greater projection of water.

It will so be noted that these spray devices are rotatably adjustable so that the water flow can be directed to all parts of the suspended carcasses.

The invention is not limited to the embodiments shown and described in detail since several modifications can be made thereto without departing from the scope of the invention.

What is claimed is:

1. An automatic machine for scalding pork carcasses after bleeding characterized in that it comprises a portable framework in which is formed a channel extending along its longitudinal axis, vertical guiding elements mounted on the framework, at least two movable scalding frames mounted on the guiding elements, a device for suspending and conveying the carcasses fixed to the upper portion of the framework and traversing the channel formed in the framework, said frames being disposed to either side of the channel, a driving device connected to each frame, at least one reversing member cooperating with the driving device and tending to actuate the frames in a vertical reciprocating motion, hot water distributing elements on each frame having openings therein, deflectors cooperating with the openings and adapted to lower the pressure of the hot water and to ensure a flow of water in the form of a sheet which surrounds the carcasses in the machine.

2. A machine according to claim 1 characterized in that the scalding frames are displaceable at the same frequency between the same extreme levels and in that they are vertically separated so that one is in a high position when the other is in a low position.

3. A machine according to claim 1 characterized by transmission means connecting the scalding frames to the driving device for ensuring that the reciprocating movements communicated in opposite phase to the frames are in synchronism, and wherein the driving device is a common driving device for the two frames.

4. A machine according to claim 3 characterized by at least one transmission chain to the ends of which respectively are attached the scalding frames, upper and lower pinions for each frame, brackets mounted on the framework to be vertically adjustable, bearings mounted in the brackets, and shafts carried by the bearings and on which are mounted the pinions, said at least one transmission chain being wound around said upper and lower pinions, and wherein said transmission means includes a sychronizing transmission connecting the lower pinions of the two frames.

5. A machine according to claim 3 characterized by electric reversing means associated with the common driving device and cams on the scalding frames, said cams cooperating in the extreme positions of the frames with the electric reversing means.

6. A machine according to claim 1 characterized in that each hot water distributing element carried by the frames is a tube having at least one lateral opening, a C section deflector being fixed to said tube and defining an eccentric channel into which laterally leads the at least one opening of the tube, said deflector having an arcuate portion and a projecting tangential extension of flat form for forming the water flow into a sheet.

7. A machine according to claim 6 characterized in that each deflector is angularly adjustable, said machine further comprising screws mounted in the corresponding scalding frame and supporting the flat tangential extension of the deflector.

8. A machine according to claim 1 characterized in that each hot water distributing element is constituted by a tube and an inclined deflector closing the tube, which tube has an inclined opening flush with the deflector.

9. A machine according to claim 8 characterized by a sleeve on each tube, which sleeve has an open extremity cut on the slant, and a lockable socket mounted and guided on said sleeve for longitudinal movement, and wherein the deflector is constituted by a deflector plate forming the bottom of the socket and being substantially parallel to the slanted end of the tube, said socket having over a limited angular extent, a clearance which presents an opening in the sleeve bounded by the slanted end of the sleeve and the deflector plate.

10. A machine according to claim 9 characterized in that the sleeve on the tube and the socket are cylindrical and relatively guided longitudinally by a screw mounted in one of these cylindrical members and passing through an elongated slot in the other, the deflector of the socket extending beyond the opening in the sleeve.

11. A machine according to claim 8 characterized in that each water tube has a threaded portion and is mounted on a tubular portion of the corresponding scalding frame, by means of a device for angularly adjusting its plane of symmetry, this device being constituted by an intermediate connection presenting a shoulder, male and female conical bearings being formed between said connection and the water tube, a threaded ring joining said bearings and resting on the shoulder of the connection and cooperating with the threaded portion of the water tube.

References Cited
UNITED STATES PATENTS

| | | | |
|---|---|---|---|
| 1,146,589 | 7/1915 | Morrison | 17—15 |
| 2,328,770 | 9/1943 | Barker | 17—11.1 |
| 2,607,073 | 8/1952 | Johnson | 17—11.2 |
| 3,178,763 | 4/1965 | Kolman | 17—1 |

LUCIE H. LAUDENSLAGER, Primary Examiner